(12) United States Patent
Chang

(10) Patent No.: US 6,270,095 B1
(45) Date of Patent: Aug. 7, 2001

(54) FOLDABLE SKATE BOARD SCOOTER

(75) Inventor: Li-Mei Chang, P.O. Box 63-247, Taichung (TW)

(73) Assignees: Joe Lee; Li-Mei Chang, both of Taichung (TW)

( * ) Notice: Subject to any disclaimer, the term of this patent is extended or adjusted under 35 U.S.C. 154(b) by 0 days.

(21) Appl. No.: 09/557,759

(22) Filed: Apr. 25, 2000

(51) Int. Cl.⁷ ...................................................... B62M 1/00

(52) U.S. Cl. ................................... 280/87.041; 280/87.05

(58) Field of Search .......................... 280/87.041, 87.05, 280/655, 655.1, 47.371; 403/150, 154, 157, 161, 84, 100, 101, 99

(56) References Cited

U.S. PATENT DOCUMENTS

| | | | |
|---|---|---|---|
| 1,300,621 | * 4/1919 | Key | 5/114 |
| 2,497,552 | * 2/1950 | Ledel | 403/65 |
| 4,707,884 | * 11/1987 | Chang | 16/440 |
| 5,927,733 | * 7/1999 | Banda | 280/87.041 |
| 6,120,044 | * 9/2000 | Tsai | 280/87.05 |
| 6,158,751 | * 12/2000 | Wu et al. | 280/87.041 |
| 6,173,976 | * 1/2001 | Lee | 280/87.05 |

OTHER PUBLICATIONS

Razor–the Original Kick Scooter/Products, p. 1, online [www.razor–scooter.com/products/130.html], Jul. 2000.*

Marriner, Bevin. Scooter Set to Catch On. The Manawatu Standard, p. 2, Nov. 1999.*

* cited by examiner

Primary Examiner—Daniel G. DePumpo
Assistant Examiner—James S. McClellan
(74) Attorney, Agent, or Firm—Rosenberg, Klein & Lee

(57) ABSTRACT

A foldable skate board assembly includes a board having a front wheel and a rear wheel attached thereto, two mounting seats mounted on the board and each including a first notch and a second notch, and a steering column including a lower end attached to the front wheel to move therewith and an upper end. The steering column includes an inclined extension pivotally connected between the mounting seats by a pivotal pin. Two handles are attached to the upper end of the steering column. A slider is slidably mounted to the inclined extension of the steering column. A positioning member is mounted to the slider to move therewith. An elastic element is mounted between the pivotal pin and the slider. The slider is slidable between a first position in which the positioning member is engaged in the first notches of the mounting seats, thereby retaining the steering column in an operative status and a second position in which the positioning member is engaged in the second notches of the mounting seats, thereby retaining the steering column in a folded status.

6 Claims, 7 Drawing Sheets

FOLDABLE SKATE BOARD SCOOTER

BACKGROUND OF THE INVENTION

1. Field of the Invention

The present invention relates to a foldable skate board scooter.

2. Description of the Related Art

A typical skate board scooter includes a board with front and rear wheels attached to an underside thereof and a steering column mounted to the front wheel for steering. The skate board scooter is foldable to provide convenient carriage and storage. Yet, the structure is too complicated and the handles on the steering column cannot be retained in place reliably.

The present invention is intended to provide a foldable skate board scooter to solve this problem.

SUMMARY OF THE INVENTION

A foldable skate board assembly in accordance with the present invention comprises:

- a board having a front wheel and a rear wheel attached thereto,
- two mounting seats mounted on the board and each including a first notch and a second notch,
- a steering column including a lower end attached to the front wheel to move therewith and an upper end, the steering column including an inclined extension pivotally connected between the mounting seats by a pivotal pin,
- two handles attached to the upper end of the steering column,
- a slider slidably mounted to the inclined extension of the steering column,
- a positioning member mounted to the slider to move therewith, and
- an elastic element attached between the pivotal pin and the slider,
- whereby the slider is slidable between a first position in which the positioning member is engaged in the first notches of the mounting seats, thereby retaining the steering column in an operative status and a second position in which the engaging member is engaged in the second notches of the mounting seats, thereby retaining the steering column in a folded status.

The inclined extension of the steering column has an inclined upper surface. The inclined upper surface has two guide slots and the slider includes two lugs slidably extended through the guide slots, the lugs having aligned holes through which the positioning member extends. The inclined extension includes two lateral sides each having a slot through which the positioning member extends. The slider further includes a pull-tab for manual operation.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
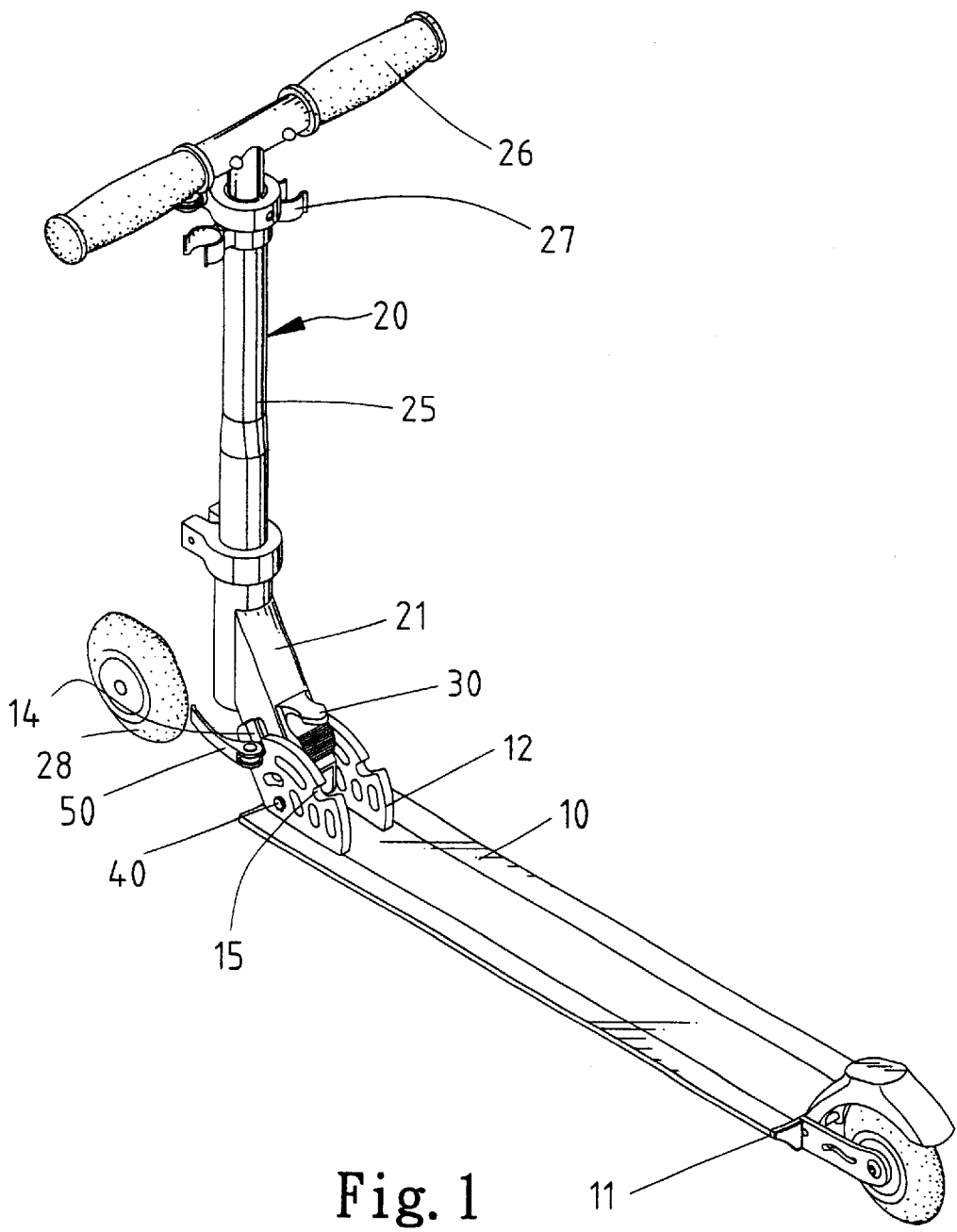
FIG. 1 is a perspective view of a foldable skate board scooter in accordance with the present invention.
Figure 2:
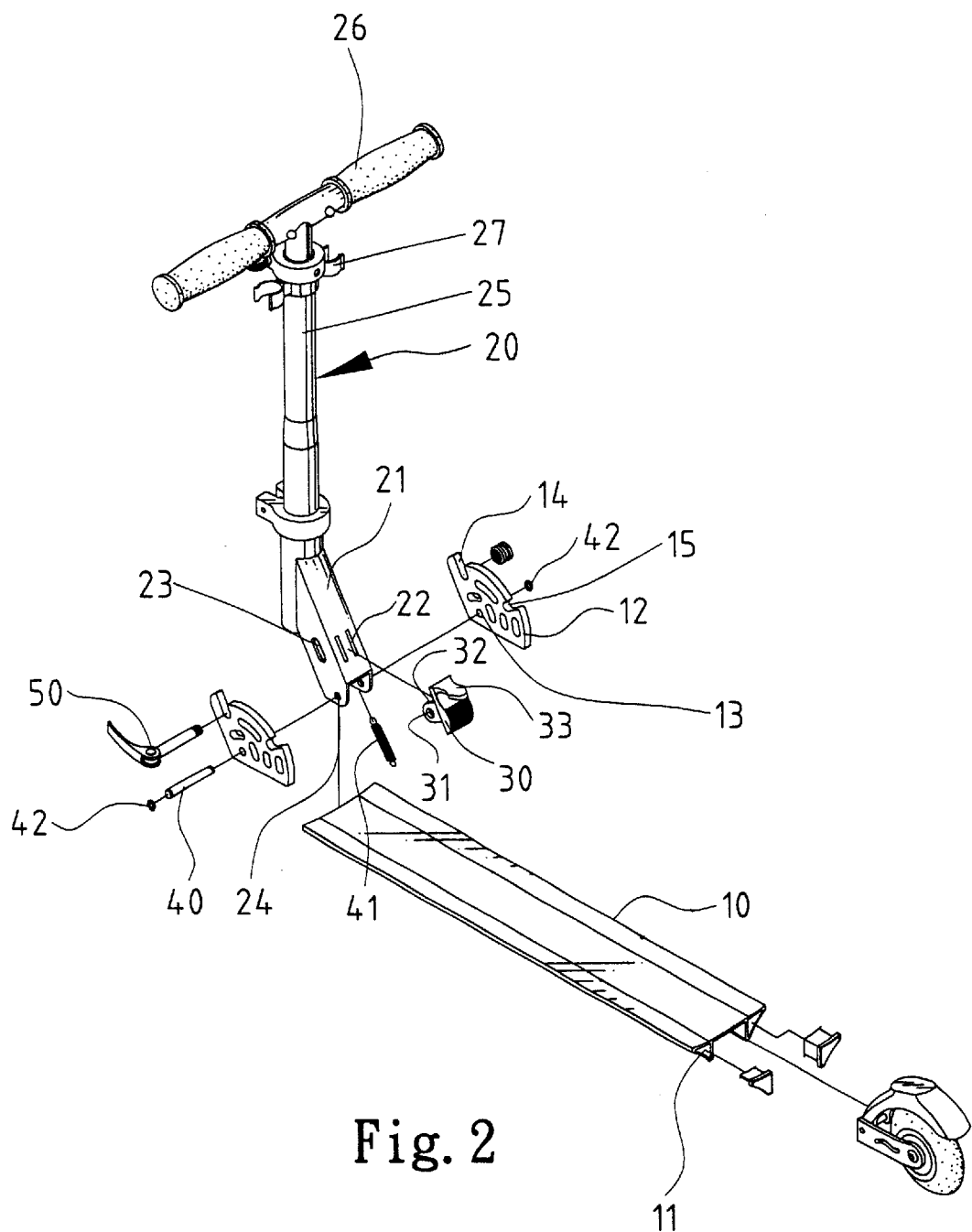
FIG. 2 is an exploded perspective view of the foldable skate board scooter in accordance with the present invention.

Referring to FIGS. 1 and 2, a skate board scooter in accordance with the present invention generally includes a board 10 with a pair of beams 11 attached to an underside thereof. A rear wheel (not labeled) is attached to a rear end of the board 10. Two sector-like mounting seats 12 are mounted to a front end of the board 10. The mounting seats 12 includes aligned pivotal holes 13, aligned first notches 14, and aligned second notches 15.

The skate board assembly further includes a steering column assembly 20 including a steering column 25 having two handles 26 mounted to an upper end thereof. A front wheel 28 (FIG. 1) is attached to a lower end of the steering column 25. Thus, the direction of the skate board scooter can be controlled by the handles 26. Each handle 26 can be pivoted and retained in place by a C-shape retainer 27 formed on the steering column 25. An inclined extension 21 extends from the steering column 25 and includes a lower end that is pivotally connected to the mounting seats 12 by a pivotal pin 40 that extends through the pivotal holes 13 of the mounting seats 12 and pivotal holes 24 in the lower end of the inclined extension 22. The inclined extension 21 further includes two guide slots 22 in an inclined upper surface (not labeled) thereof. The inclined extension 21 further includes a slot 23 in each lateral side thereof.

A slider 30 includes a pull-tab 33 formed on a first surface thereof for manual operation. Two spaced lugs 32 are formed on a second surface thereof and have aligned holes 31. A positioning member 50 is extended through the holes 31 of the lugs 32 of the slider 30. At least one elastic element (e.g., a spring 41) is provided and includes a first end attached to the positioning member 50 and a second end attached to the pivotal pin 40, which, in turn, is retained in place by two C-clips 42.

Figure 3:
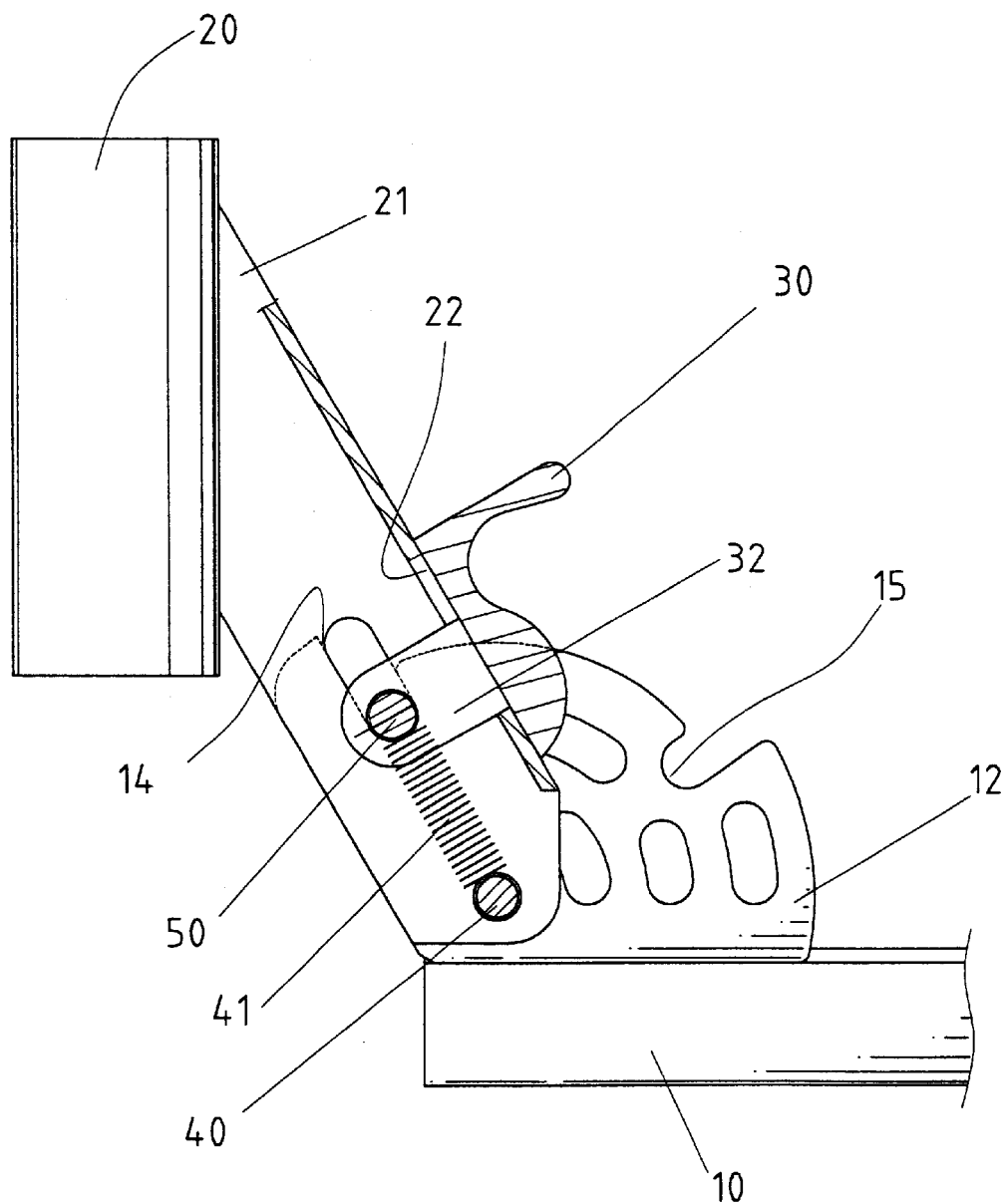
FIG. 3 is an enlarged view, partly sectioned, of a portion of the foldable skate board scooter in accordance with the present invention, wherein the skate board scooter is in an operative status.
Figure 4:
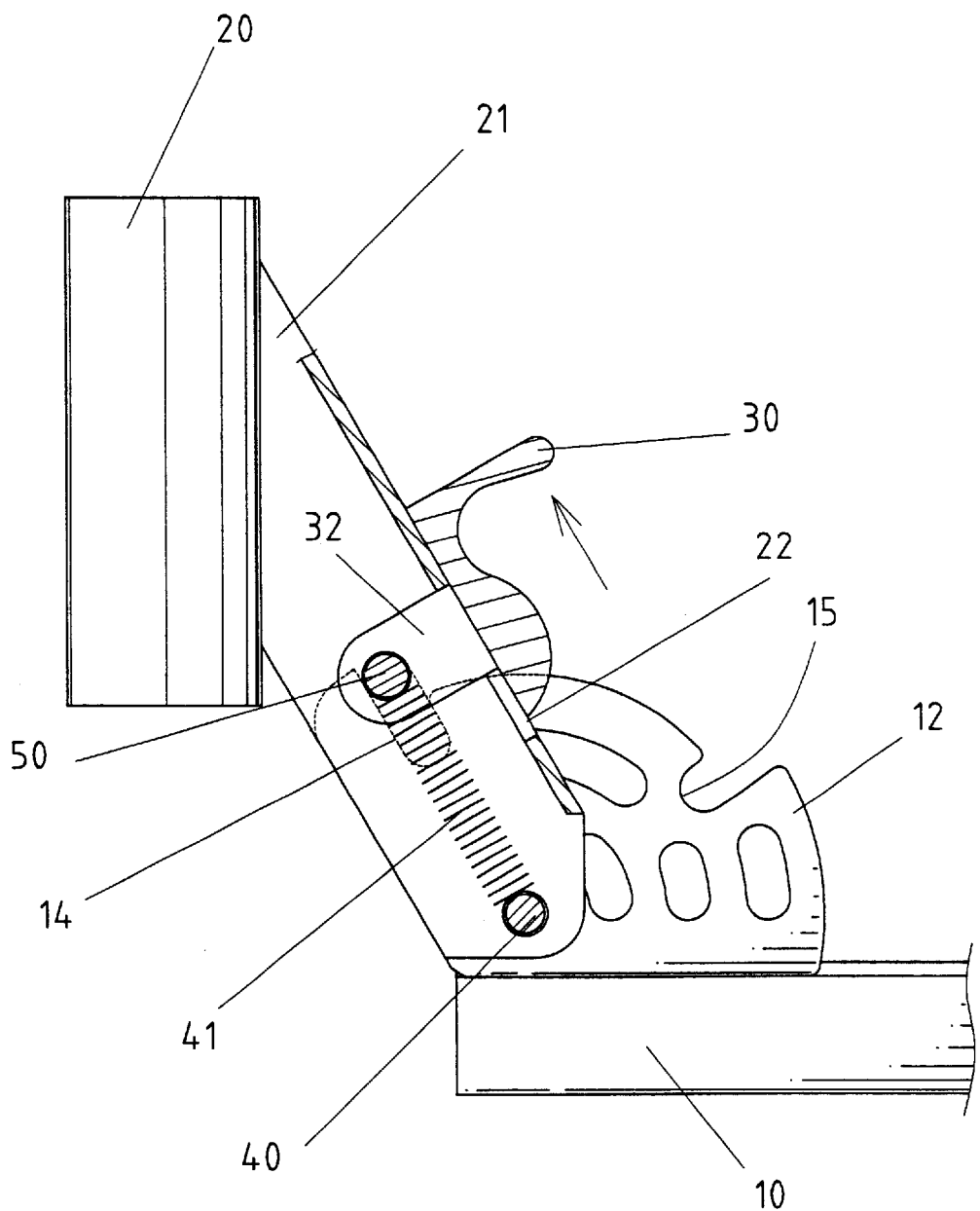
FIG. 4 is a view similar to FIG. 3, wherein a pull-tab is moved upward for folding operation.
Figure 5:
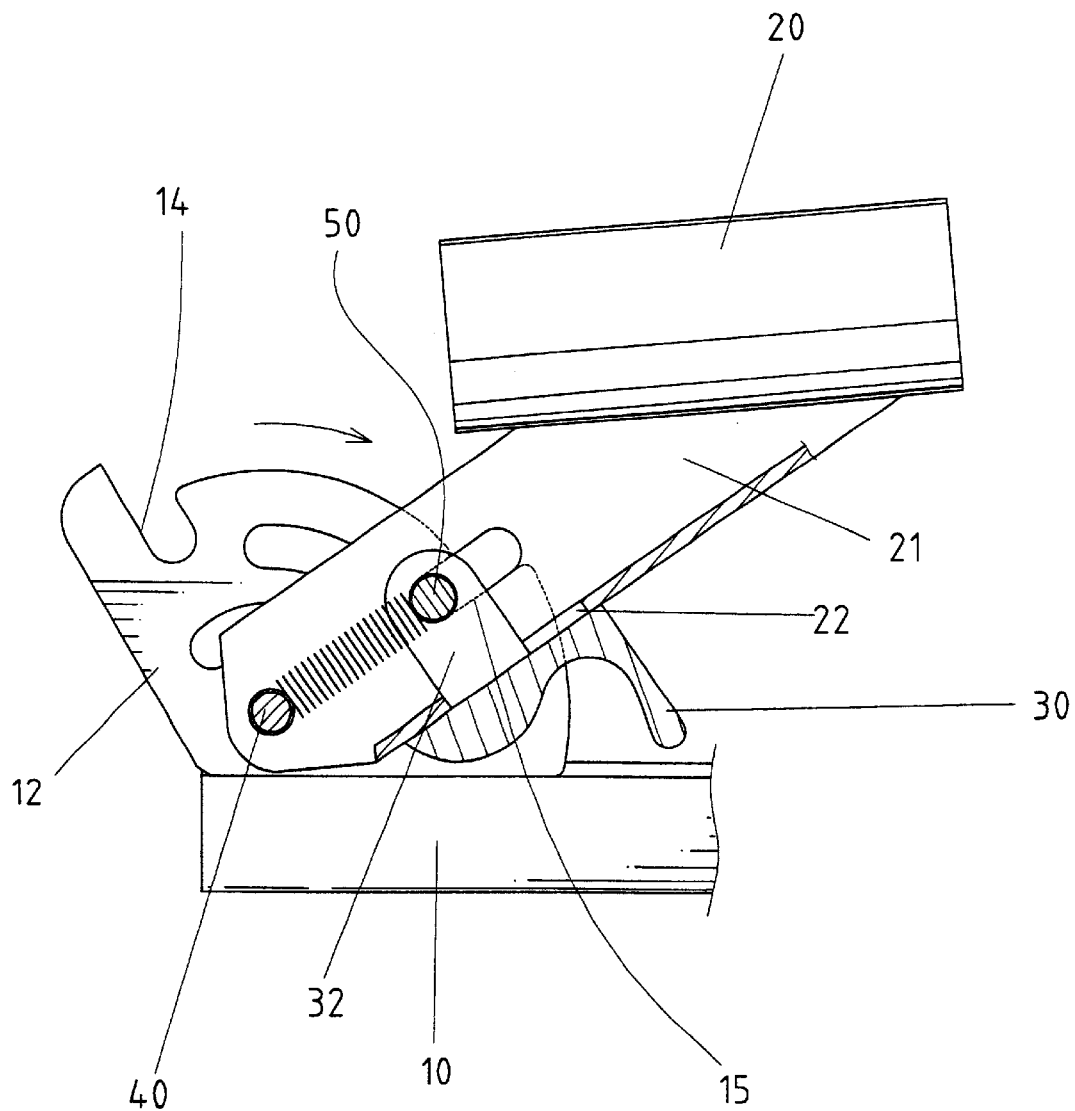
FIG. 5 is a view similar to FIG. 4, wherein the pull-tab is pivoted to a storage position.
Figure 6:
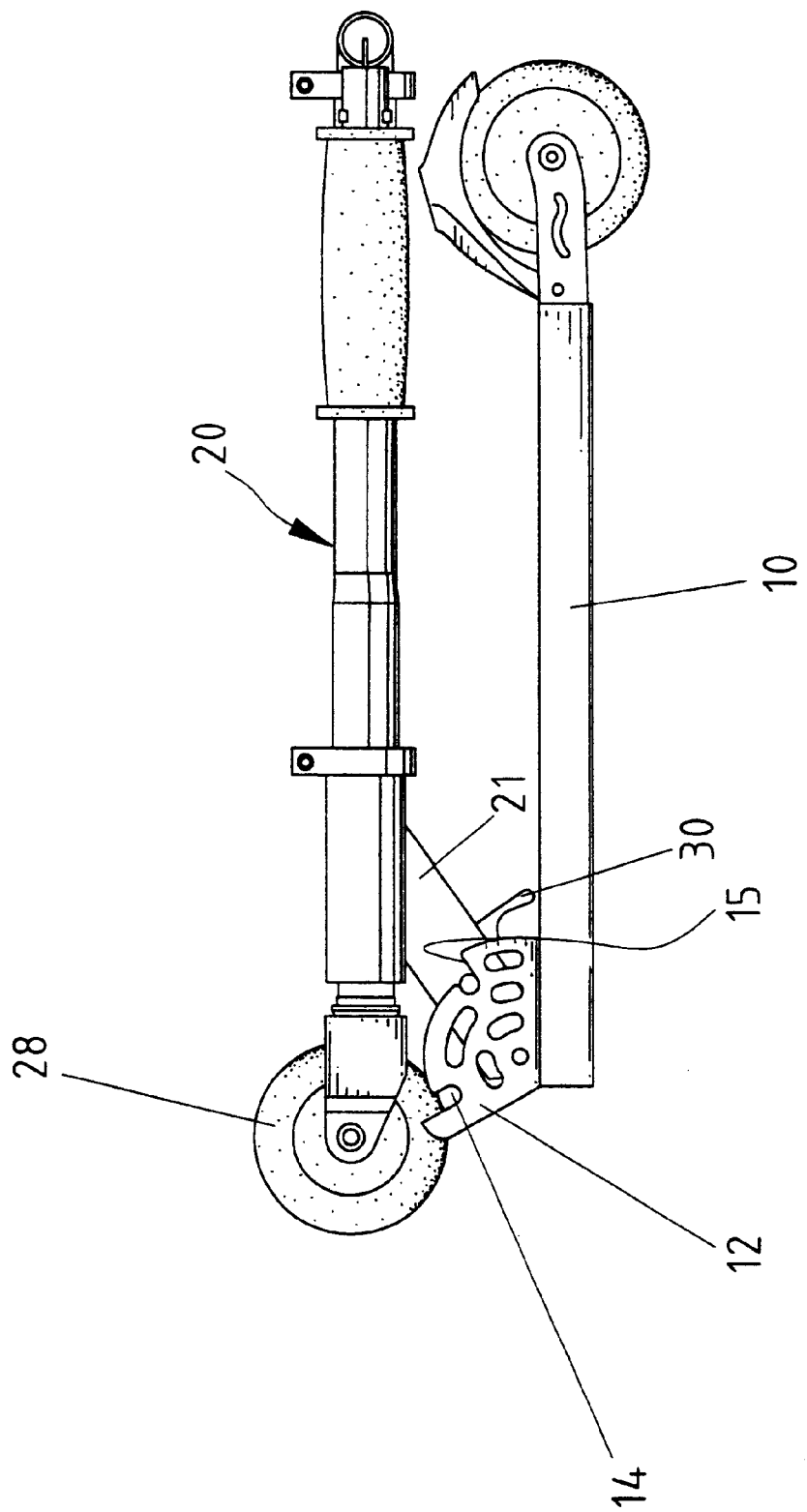
FIG. 6 is a side view of the folded skate board scooter.
Figure 7:
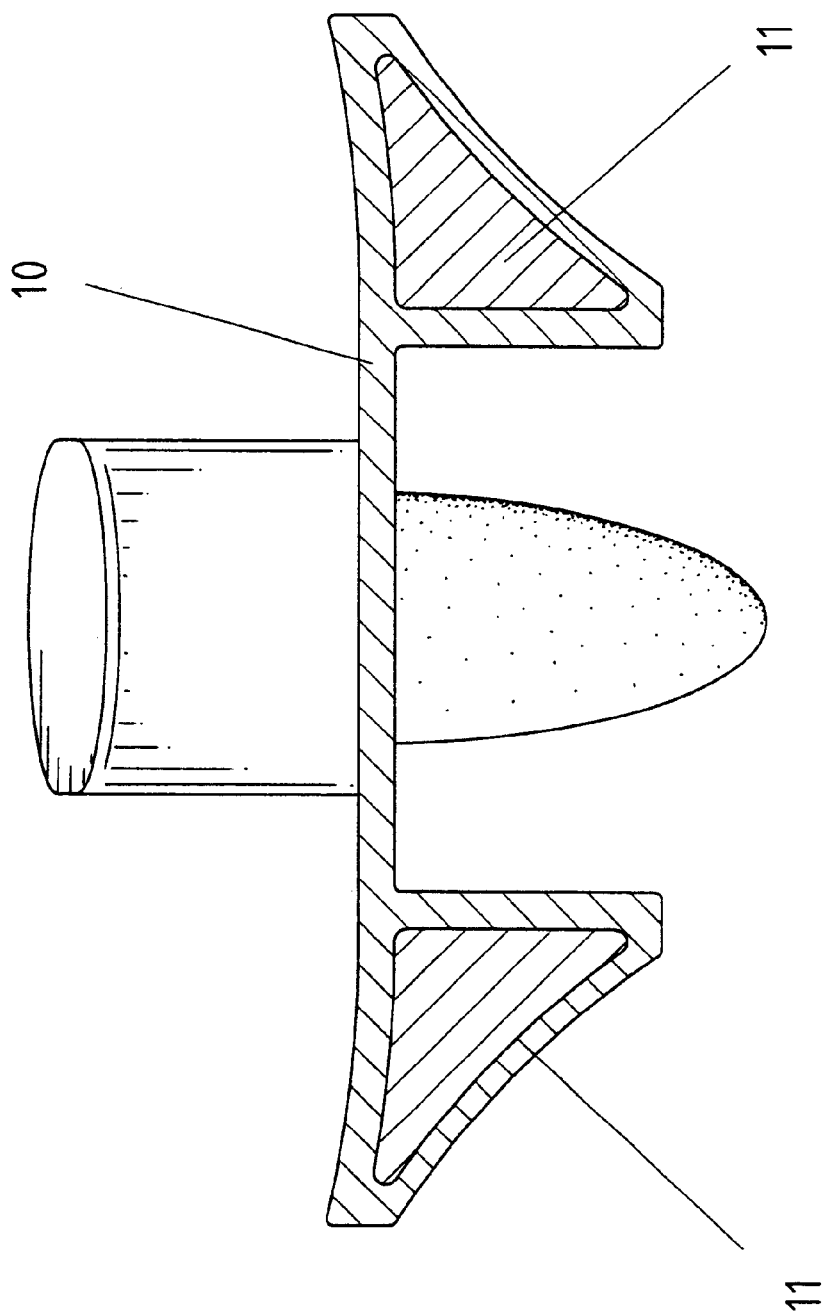
FIG. 7 is a sectional view of the skate board scooter in accordance with the present invention.

The skate board scooter in FIG. 3 is in an operative status, wherein the positioning member 50 is retained in the aligned first notches 14 of the mounting seats 12. When folding is required, the user may pull the slider 30 upward by grasping the pull-tab 33 to disengage the positioning member 50 from the first notches 14, as shown in FIG. 4. Then, the steering column 25 is pivoted relative to the mounting seats 12 to a position shown in FIG. 5, and the positioning member 50 is reliably engaged with the second aligned notches 15 under action of the spring 41. It is noted that the handles 26 can be folded and the steering column 25 can be collapsed (if it is collapsible) before moving the steering column 25 to the folded position shown in FIG. 6. FIG. 7 shows reinforced structure for the beams 11.

Although the invention has been explained in relation to its preferred embodiment, it is to be understood that many other possible modifications and variations can be made without departing from the spirit and scope of the invention as hereinafter claimed.

What is claimed is:

1. A foldable skate board assembly comprising:

a board having a front wheel and a rear wheel attached thereto, two mounting seats mounted on the board and each including a first notch and a second notch, a steering column including a lower end attached to the front wheel to move therewith and an upper end, the steering column including an inclined extension pivotally connected between the mounting seats by a pivotal pin, the inclined extension having an inclined upper surface with two guide slots formed therein, two handles attached to the upper end of the steering column, a slider slidably mounted to the inclined extension of the steering column, the slider including two lugs slidably extended through the guide slots, the lugs having aligned holes formed therethrough, a positioning member extending through the aligned holes in the lugs of the slider to move therewith, and an elastic element attached between the pivotal pin and the slider, whereby the slider is slidable between a first position in which the positioning member is engaged in the first notches of the mounting seats, thereby retaining the steering column in an operative status and a second position in which the positioning member is engaged in the second notches of the mounting seats, thereby retaining the steering column in a folded status.

2. The foldable skate board scooter as claimed in claim 1, wherein the inclined extension includes two lateral sides each having a slot through which the engaging member extends.

3. The foldable skate board scooter as claimed in claim 1, wherein the slider further includes a pull-tab for manual operation.

4. The foldable skate board scooter as claimed in claim 1, wherein the handles are foldable to a storage position.

5. The foldable skate board scooter as claimed in claim 4, wherein the steering column includes two retainers each for receiving an associated said handle when the handles are in the storage position.

6. The foldable skate board scooter as claimed in claim 1, wherein the steering column is collapsible.

\* \* \* \* \*